US006985462B2

(12) United States Patent
Hosein

(10) Patent No.: US 6,985,462 B2
(45) Date of Patent: Jan. 10, 2006

(54) SYSTEM AND METHOD FOR USER SCHEDULING IN A COMMUNICATION NETWORK

(75) Inventor: Patrick Ahamad Hosein, San Diego, CA (US)

(73) Assignee: Telefonaktiebolaget LM Ericsson (publ), (SE)

( * ) Notice: Subject to any disclaimer, the term of this patent is extended or adjusted under 35 U.S.C. 154(b) by 962 days.

(21) Appl. No.: 09/972,793

(22) Filed: Oct. 5, 2001

(65) Prior Publication Data

US 2003/0067935 A1     Apr. 10, 2003

(51) Int. Cl.
*H04Q 7/00*    (2006.01)
(52) U.S. Cl. ............ 370/329; 370/328; 370/338; 370/412; 709/237; 709/248
(58) Field of Classification Search ........ 370/328, 370/329, 319–321, 338, 347, 349, 341, 345, 370/464, 465, 468; 709/223, 224, 237, 248
See application file for complete search history.

(56) References Cited

U.S. PATENT DOCUMENTS

2002/0191555 A1 * 12/2002 Borst et al. ............. 370/329
2003/0007466 A1 *  1/2003 Chen .................... 370/328

FOREIGN PATENT DOCUMENTS

| EP | 1091307 |   | 4/2001  |
|----|---------|---|---------|
| EP | WO 01/52588 A | * | 7/2001 |
| EP | 1091307 A | * | 11/2001 |
| WO | WO 0152588 |   | 7/2001 |

OTHER PUBLICATIONS

"Charging and Rate Control For Elastic Traffic" Frank Kelly (12 pages).
"Charging and Rate Control For Elastic Traffic, Correction to Published Version" Ramesh Johari and Frank Kelly (4 pages).
Laakso, J et al: "Radio resource knapsack packing for WCDMA air interface" Personal, Indoor and Mobile Radio Communications, 1998. The Ninth IEEE International Symposium on Boston, MA, USA Sep. 8-11, 1998, New York, NY, USA, IEEE, US, pp. 183-187, XP010314777 ISBN: 0-7803-4872-9.
Lu, Y et al: "Unified power control, error correction coding and scheduling for a CDMA downlink system" Wireless Networks, ACM, US, vol. 2, No. 1, Mar. 1, 1997, pp. 83-90, XP000688203 ISSN: 1022-0038.
Reklaitis, G V: "Scheduling approaches for the batch process industries" ISA Transactions, Instrument Society of America. Pittsburgh, US, vol. 34, No. 4, Dec. 1, 1995, pp. 349-358, XP004020089 ISSN: 0019-0578.

* cited by examiner

*Primary Examiner*—Wellington Chin
*Assistant Examiner*—Raj Jain
(74) *Attorney, Agent, or Firm*—Coats & Bennett, P.L.L.C.

(57) ABSTRACT

A "primal ascent" technique for scheduling the shared use of a limited resource may be applied to scheduling users in a high data rate (HDR) communication network, such as in a HDR network based on the TIA/EIA/IS-856 air interface standard. In a HDR network, active users share the air interface, and the network delivers data to individual users through the air interface one at a time. The primal ascent approach to user scheduling accommodates a flexible range of utility function types, including non-differentiable types, where utility functions describe the cost, benefit, or revenue gain associated with serving users. Primal ascent techniques allow service providers to, among other things, use different types of utility functions for differentiating between user types or associated grades of service, and allow them to use utility functions that change over time.

65 Claims, 6 Drawing Sheets

SYSTEM AND METHOD FOR USER SCHEDULING IN A COMMUNICATION NETWORK

BACKGROUND OF THE INVENTION

The present invention generally relates to wireless communication networks, and particularly relates to user scheduling in such networks.

In some types of wireless communication networks, access terminals share the air interface between the terminals and the network. High data rate (HDR) networks configured according to the TIA/EIA/IS-856 standard exemplify this shared interface concept. With shared forward link resources, the network serves only one access terminal in a group at any given instant. By rapidly switching service between the terminals, the plurality of terminals is simultaneously, albeit discontinuously, served by the network. Deciding which terminal to serve in any given service interval is the function of a "scheduler." The scheduler typically comprises program logic or software services intended to fulfill this function. Scheduling operations are typically governed by a service goal or constraint.

Selecting the "best" user for service at each scheduling decision point is an optimization problem. In optimization problems, utility functions are used to characterize the cost or benefit of a change. In scheduling air interface usage, utility functions define the utility of serving individual users. The optimization problem becomes one of maximizing an objective function whose value is dependent upon the set of utility functions. A scheduler repeatedly evaluates the objective function to move towards an optimum schedule for sharing the limited resources of the air interface between active users.

Past approaches to network scheduling the use of shared resources within a communication network include so-called "proportional fair" scheduling techniques. Proportional fair scheduling seeks to maximize the objective function, and is essentially a maximum dual-ascent approach that reduces to finding the direction of maximum gradient for the objective function at each scheduling decision point.

While proportional fair scheduling works well in some circumstances, its use places overly limiting restrictions on the nature of utility and objective functions that may be defined for serving users. These restrictions hamper a service provider's flexibility in terms of denying scheduling flexibility. Thus, alternative approaches that offer additional flexibility or impose fewer constraints on the type or types of scheduling functions that may be used are needed.

BRIEF SUMMARY OF THE INVENTION

The present invention comprises a system and method for scheduling use of the shared air interface in a communication network, preferably a HDR network, to maximize revenue or other service goal defined by one or more objective functions. For each service interval, there are a number of service scenarios equal to the number of users that are candidates for service in the current service interval. Each service scenario corresponds to serving one of the users to the exclusion of the remaining users. The "primal ascent" approach to scheduling described herein serves the user whose corresponding service scenario yields the greatest net gain in the objective function.

By evaluating net gain rather than gradient, for example, the primal ascent scheduler allows tremendous flexibility in the selection of the utility functions that describe the incremental benefit or change in the objective function for individual users. With gradient-based approaches, utility functions must be differentiable, but with primal ascent scheduling, this restriction is removed. Thus, the objective function may be modified by one or more non-differentiable barrier functions that bound or restrict it in consideration of upper and/or lower data rates. Using barrier functions allows a system operator to bias the scheduling of users such that users on average do not exceed an upper data rate bound, or do not fall below a lower data rate bound if radio conditions permit.

In addition to the flexibility of biasing average data rates through barrier function use, the primal ascent approach to scheduling allows system operators to simultaneously use different utility functions for different users. As the utility function describes the incremental cost or gain associated with serving a given user, this allows the service provider to offer users differing qualities of service. That is, a premium user might be assigned a utility function that causes that user to generally attain a higher average data rate while connected with the network than would be achieved by a non-premium user.

This flexibility regarding utility functions further allows the system operator to use different utility functions at different times of the day, or to define utility functions whose weighting changes over time. Primal ascent scheduling easily accommodates non-separable utility functions, so the system operator may construct types or combinations of utility functions that may be awkward to use with conventional gradient-based scheduling optimization.

DETAILED DESCRIPTION OF THE INVENTION

In many types of communication systems, users compete for or otherwise share one or more limited resources. Scheduling techniques or algorithms decide how these limited resources are shared or allocated between users. Understandably, not all scheduling techniques are equally suitable in all circumstances. The scheduling technique of the present invention, referred to as "primal ascent" scheduling, has particular suitability for use in HDR networks, such as those networks based on the TIA/EIA/IS-856 standard. Reasons why the primal ascent approach has particular advantages within the framework of HDR networks are thoroughly discussed below, but it should be understood that the scheduling techniques and supporting ideas disclosed herein have utility in other types of communication networks, and for other types of shared resources.

Figure 1:
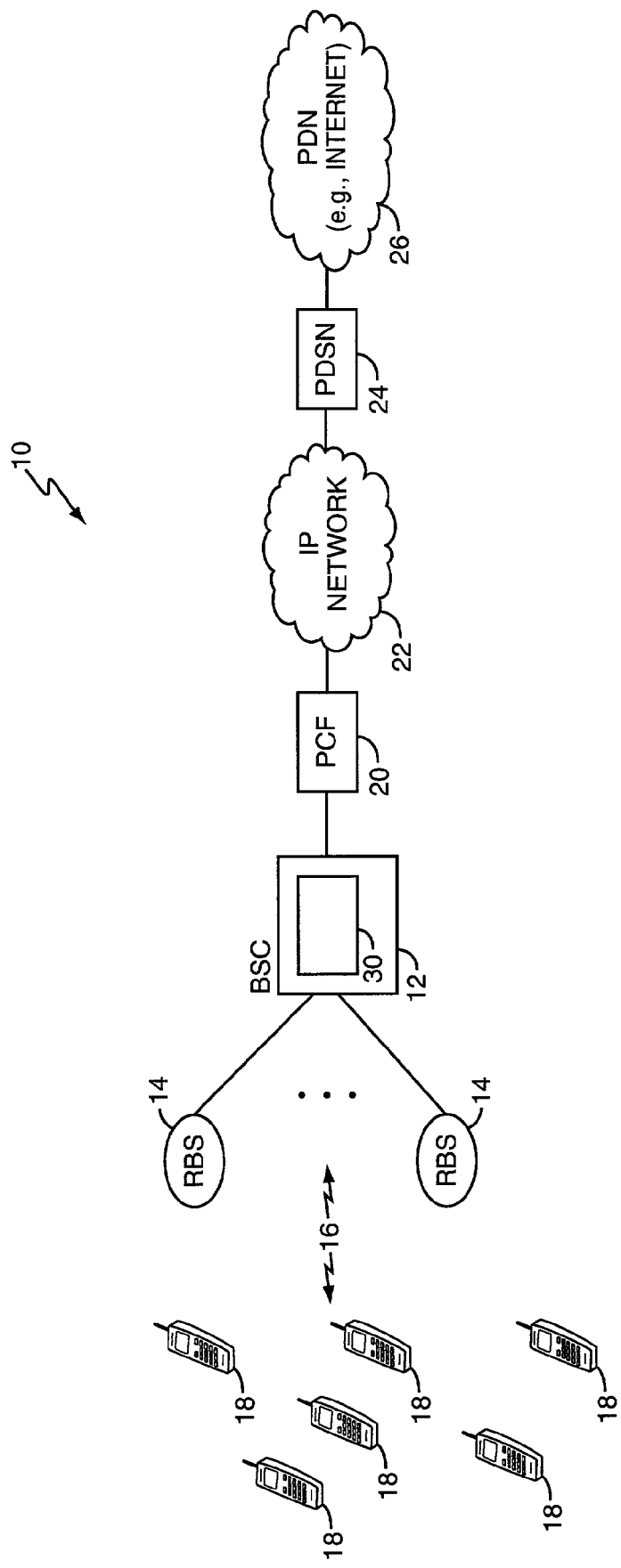
FIG. 1 is a diagram of an exemplary HDR network.

Turning now to the drawings, FIG. 1 illustrates an exemplary HDR network generally referred to by the numeral 10. The network 10 comprises one or more base station controllers (BSCs) 12, a plurality of radio base stations (RBSs)

14 for communicating with wireless access terminals (ATs) 18, one or more packet control functions (PCFs) 20, an IP network 22, and one or more packet data serving nodes (PDSNs) 24 for communicating with external public data networks (PDNs) 26, such as the Internet.

In operation, the BSC 12 controls one or more RBSs 14 that provide the RF-based air interface 16 used to communicate with the users. The term "user" herein connotes an AT 18 or other wireless device, unless otherwise stated. For HDR and certain other types of communication networks, the air interface 16 represents a resource that is shared by the users of the network 10 (i.e., shared between ATs 18). Data to and from the ATs 18 is routed to the appropriate BSC 12 by the PCF 20. The PCF 20 communicates through the IP network 22 with the PDSN 24, which is communicatively coupled to the Internet or other PDNs 26. Thus, data passes between one or more PDNs 26 and individual ones of the ATs 18 through the network 10.

The scheduler of the present invention may be implemented in software, hardware, other types of program logic, or in some combination thereof. For example, a processor 30 (or processors) in the BSC 12, or in the RBSs 14, may perform primal ascent scheduling based on execution of program code or software. In this manner, the BSC 12 or RBSs 14 can control use of the air interface 16 by users (i.e., ATs 18) in accordance with the present invention. However, it should be understood that other network entities, whether or not illustrated in FIG. 1, might be responsible for scheduling.

To understand some of the advantages associated with scheduling use of the air interface 16 based on the primal ascent technique of the present invention, one must first understand something about the air interface as defined in HDR networks. At any given time, a plurality of users (e.g., ATs 18) is simultaneously connected with the network 10. However, the network 10 delivers data to only one user at a time. That is, the whole group of users shares the air interface 16, but the network 10 feeds data to only one user at any given instant. The trick comes in determining which particular user candidate to serve at any given instant. Making that service decision depends on any number of constraints, as well as on the service provider's objectives.

HDR networks adopt a time division multiple access (TDMA) approach to the forward link air interface 16 used to transfer data from the network 10 to individual ones of the users. Thus, discussing the scheduling of users or user candidates practically means scheduling the times at which the particular users (i.e., ATs 18) are served within the time multiplexing scheme of the HDR air interface.

HDR networks use rate control rather than power control on the forward link and each AT 18 sends updated rate requests to the network 10 indicating the rate at which the AT 18 desires service. Thus, an AT 18 generally requests data at the highest rate that is feasible for the current radio conditions at the terminal. One measure of radio conditions is expressed as the carrier-to-interference (C/I) ratio. Higher C/I ratios indicate favorable reception conditions at the AT 18 and support higher data rates.

Each user (AT 18) updates its requested rate by periodically transmitting Data Rate Control (DRC) symbols to the network 10 on reverse link DRC channels. The DRC symbol value corresponds to one of a defined number of forward link data rates. At any given instant in time, some ATs 18 will request relatively high data rates, and some will request relatively low data rates, reflecting the differing reception conditions at various ones of the active terminals. The TIA/EIA/IS-856 standard provides for DRC symbol rates at up to 600 Hz, meaning that individual ATs 18 may request very rapid adjustments in the forward link data rate.

The scheduler, in at least some embodiments uses the requested data rates to determine which user or users to serve in any given service interval. The historic or past average data rates of the individual users may also be considered. For this discussion, let $r_i$ represent the average throughput for the $i^{th}$ user, and let $d_i$ represent the currently requested data rate for serving the $i^{th}$ user. Average throughput and requested rate are generally expressed in Kbits per second (kbps). With this notation, the entire sets of requested rates and average throughputs for all users are expressed in vector form as, $\vec{d}(n)$ and $\vec{r}(n)$, respectively. Here, the "n" generally indicates the $n^{th}$ time slot. It is assumed that user scheduling entails selecting the user or users to be served in each of a succession of service intervals. That is, it is assumed that user scheduling is an ongoing operation for so long as one or more users have connections to the network.

For example, scheduling intervals might be based on the HDR frame rate of 26.6 ms, wherein the DRC information associated with each AT 18 determines the number of bits per frame and the number of time slots used to deliver data to the AT 18, if that terminal is to be served. For a detailed treatment of the air interface 16 and its frame/slot timing in HDR embodiments, the reader is referred to standard document 3GPP2 C.S0024, Version 2.0, dated Oct. 27, 2000, as promulgated by the 3rd Generation Partnership Project 2 (3GPP2). This standards document is entitled "cdma2000 High Rate Packet Data Air Interface Specification," and is incorporated in its entirety herein by reference.

In HDR networks, if the scheduler chooses to serve a given terminal, the amount of service given to that terminal within that service interval is set by the DRC information associated with the terminal. For example, choosing to serve a given user might entail serving that user for a total of eight time slots, although these time slots may be interleaved with time slots dedicated to one or more other users. Overall, the scheduler might try to ensure that each user is selected for service often enough to insure that the average throughput for that user does not fall below some desired limit. However, this strategy reflects just one of many possible considerations that might bear on the scheduling strategy.

A service provider (e.g., a network operator) may have a particular goal or goals in mind with regard to scheduling service to users. For example, the service provider may want to maximize its revenue, where revenue may be a function of maintaining the highest aggregate average data throughput, or by insuring that at least a subset of users achieve relatively high average throughput, perhaps at the expense of other users. Scheduling thus becomes an optimization problem wherein the goal is to control scheduling in a manner that attempts to optimize one or more service objectives.

Figure 2:
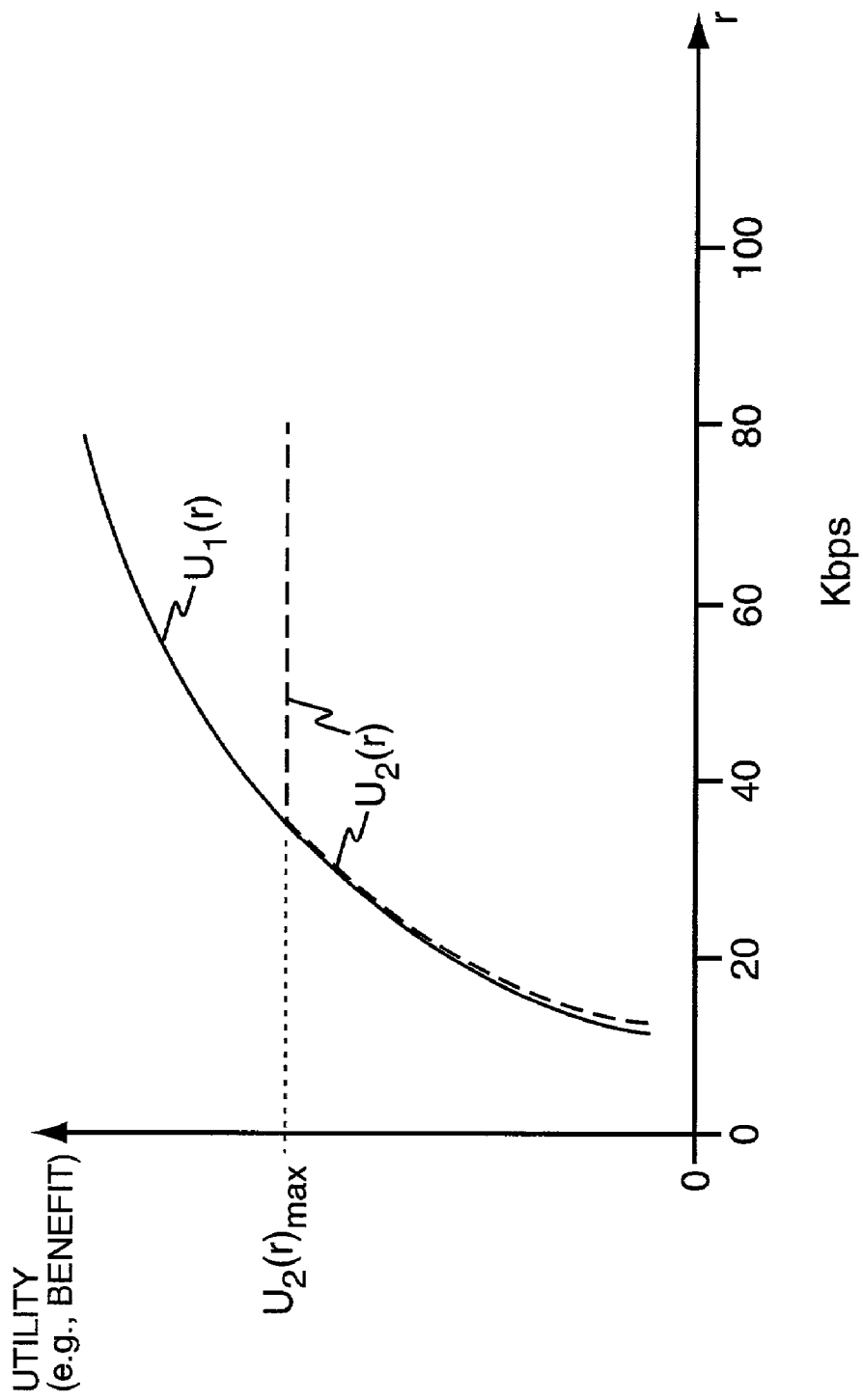
FIG. 2 is a graph of a conventional, differentiable utility function and a bounded, non-differentiable utility function.

In optimization problems, a utility function is used to describe the measure of cost or benefit associated with a contemplated change in a variable or quantity bearing on the function to be optimized. The scheduler defines a utility function for each user, describing the benefit associated with serving that user. FIG. 2 plots a typical utility function $U_1(r)$ for the $i^{th}$ user as a function of data rate r in kbps (solid line), and further plots a bounded utility function $U_2(r)$ (dashed line) that is non-differentiable because of the upper limit placed on $U_2(r)$. By bounding $U_2(r)$, the gain in revenue or benefit as generated by evaluating $U_2(r)$ for individual users is capped at a given upper threshold. This has, in this example, the effect of reducing the incentive to serve users having an already high average served rate r.

In a conventional approach to scheduling, such as in a proportional fair approach, the same U(r) function is associated with all users, and certain restrictions are placed on U(r). For example, because proportional fair scheduling is essentially a gradient-based approach, the utility function U(r) must be differentiable at all points. Thus, use of the bounded $U_2(r)$ would not be possible with any of the common gradient-based scheduling approaches. Use of bounded utility functions is discussed more fully below in the context of "barrier functions."

If the objective function is non-separable, partial differentiation of the objective function as required in gradient-based approaches may require overly complex calculations. Avoiding this complexity limits the opportunity to use different utility functions to support groups of users at different scheduling priorities, and constrains the types of utility functions that may be used. This separability limitation is discussed more fully below, particularly in the context of scheduling users based on differing user classes and in time-of-day based scheduling.

A further drawback to proportional fair scheduling in HDR networks arises from the essential operation of that type of scheduling. With proportional fair scheduling, an objective function F is based on the set of utility functions U(r) associated with the users. For N users, the objective function F exists in N-dimensional space. Thus, at each point along the objective function F, one can move in any one of N directions. At each scheduling interval, a proportional fair scheduler serves the user that moves the objective function in the direction of the steepest gradient. Because the user corresponding to that direction must be served by the amount requested in accordance with the DRC information for that user, the magnitude of movement in the chosen direction is set by the AT 18 and not by the scheduler. If the objective function F is not monotonic, moving in the direction of steepest gradient may actually reduce rather than increase the objective function.

Figure 3:
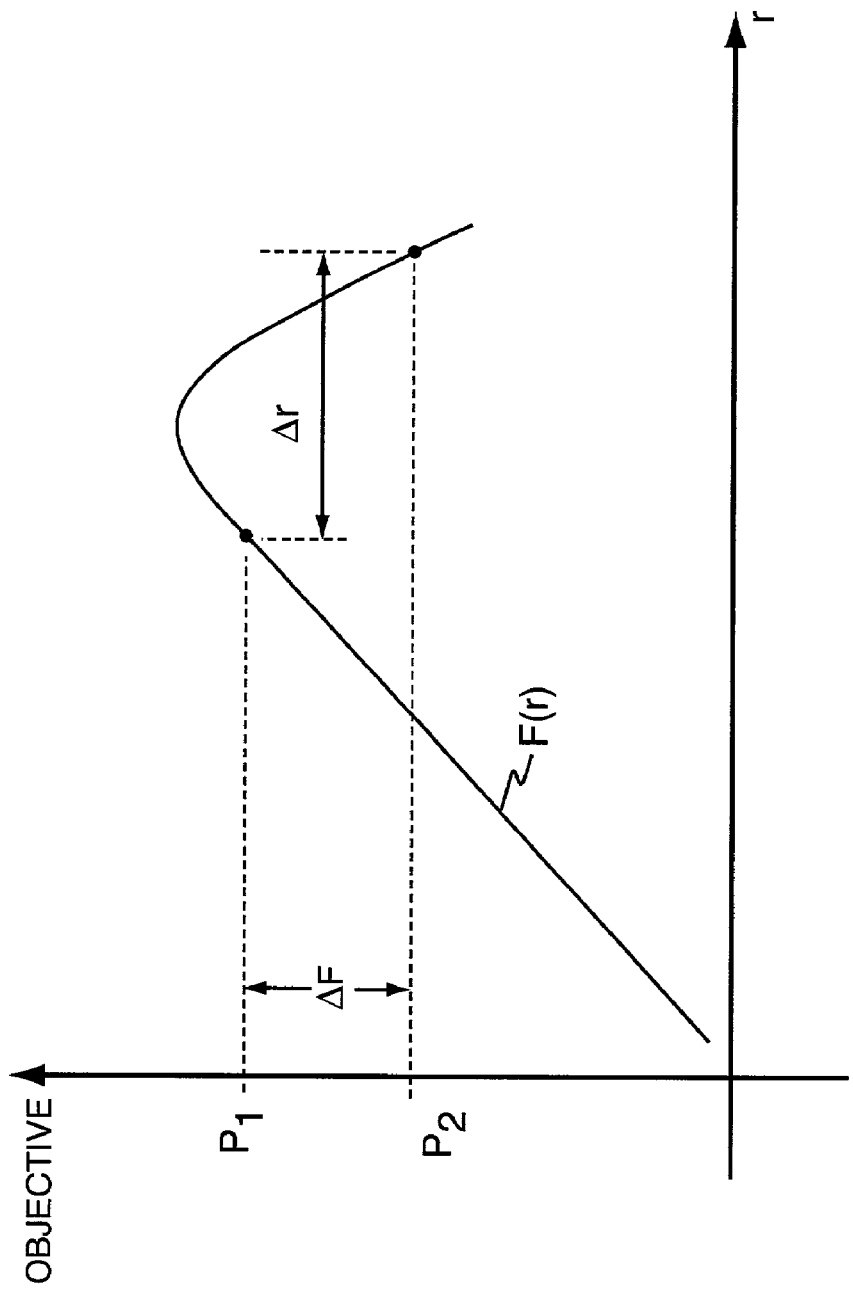
FIG. 3 is a graph of a non-monotonic objective function.

FIG. 3 illustrates an objective function F that is not monotonic, and is used to illustrate the consequence of considering only the gradient when selecting the user to be served. Here, moving in the direction of the steepest gradient by the amount required to meet the selected user's DRC request actually moves the objective function F(r) past a peak value, and on downwards on its reverse slope. Because the network 10 must serve the selected user by the requested amount, the change in objective function F(r) goes from a starting point P1 to an ending point P2. Here, with a non-monotonic objective function F(r), the change ΔF in the objective function F is actually negative. That is, the net change in the objective function F arising from the decision to serve the $i^{th}$ user in the particular service interval illustrated resulted in an overall decrease of F. While this $i^{th}$ user might correspond to the steepest gradient, the user does not correspond to the optimum service selection. Here, the primal ascent approach to scheduling would identify the undesirability of serving this user, where a gradient-based approach would not.

Thus, the primal ascent technique in the present invention evaluates the net change in an objective function F that would result from serving each user by the required amount for a given service interval. The starting value of the objective function (point P1) is the same for all users before the next user is chosen for service, so the primal ascent approach evaluates the ending points (points P2) for all users and picks the user corresponding to the most favorable ending point.

Essentially, then, primal ascent scheduling assigns one or more types of utility functions to users that are competing for the shared resource (e.g., the HDR air interface 16). These users may be thought of as candidates for service. By defining the utility function or functions assigned to the candidates as benefit functions, these functions define benefit curves associated with serving the candidates. As noted, all candidates may use the same curve, or different candidates may use different curves (functions).

The average served data rate of a given candidate defines a current point (value) on that candidate's benefit curve. Selecting that candidate for service in a given service interval moves that candidate positively along the benefit curve, but also causes the other candidates to incrementally move negatively along their respective benefit curves. This latter result arises from not serving these other candidates during the service interval. Note that "positive" and "negative" as used here are relative terms and their absolute sense depends on the nature of the particular utility functions involved.

Because the objective function depends on the overall set of utility functions associated with the candidates, its value changes as the aggregate of changes in the utility functions. At a given scheduling decision point, the value of the objective function F is based on the set of average throughputs $\overset{p}{d}(n)$ from the most recent time slot n. This objective function value may be considered a starting point. Then, for each user, the primal ascent approach determines the overall change in the objective function F for each user by comparing the ending point that the objective function F will move to if that user is served.

Therefore, as noted, primal ascent considers the net or overall benefit that would be gained by serving each of the candidates at the expense of the other candidates for at least a portion of a given service interval, and serves the candidate having the most favorable or desirable net change. The net change may be considered a "selection metric." That is, selecting different candidates for service results in different values of net change in the objective function. The process or step of selecting a user depends on identifying the best or most favorable net change hence this may be thought of as considering each candidate's selection metric.

By evaluating net or aggregate change, the primal ascent approach works to move the objective function F towards a maximum value with each service decision made, and removes the restrictions otherwise placed on the utility and objective functions. That is, by evaluating net changes in the objective function F, the objective function need not be monotonic, and the underlying user utility functions need not differentiable, and need not be separable. A further advantage detailed later is that the utility functions assigned to the users may be modified using so-called barrier functions that place constraints on upper or lower throughput such that users or selected groups of users may be biased toward desired average throughput values.

Consider the HDR case of a separable objective function F comprising a sum of strictly concave differentiable utility functions. The change in the objective function F if user j is chosen may be denoted as, $$\Delta F_j(\vec{r}(n)) = \left[ U_j\left(\left(1 - \frac{1}{\tau_c}\right)r_j(n) + \frac{d_j}{\tau_c}\right) - U_j(r_j(n)) \right] + \sum_{i=1, i \neq j}^{k} \left[ U_i\left(\left(1 - \frac{1}{\tau_c}\right)r_i(n)\right) - U_i(r_i(n)) \right] \quad (1)$$

Where $U_j(r)$ and $U_i(r)$ are utility functions for the $j^{th}$ and $i^{th}$ users, respectively, $r_j(n)$ and $r_i(n)$ are average throughputs of the $n^{th}$ time slot or service interval for the $j^{th}$ and $i^{th}$ users, respectively, and $\tau_c$ is a throughput filter time constant.

The primal ascent approach selects the user $j^*$ that maximizes the net change in the objective function F. This selection may be expressed mathematically as follows, $$j^* = \underset{j}{\operatorname{argmax}}\{\Delta F_j(\vec{r}(n))\} = \underset{j}{\operatorname{argmax}}\{U_j((1 - 1/\tau_c)r_j(n) + d_j(n)/\tau_c) - U_j((1 - 1/\tau_c)r_j(n))\} \quad (2)$$

where $j^*$ corresponds to the user that yields the greatest net change in the objective function F.

If proportional fair scheduling were applied to (2), with the utility function defined as $U(r)=1/r$, the result would be, $$j^* = \underset{j}{\operatorname{argmax}}\left\{\frac{d_j(n)}{r_j(n)}\right\}, \quad (3)$$

which represents choosing the user having the largest ratio of requested data rate to past average data rate (i.e. requested rate to average throughput). For this particular U(r), primal ascent scheduling yields the same result (i.e., selects the same user j) as when the proportional fair scheduler is used. However, primal ascent scheduling arrives at this result by considering the actual changes associated with the different service scenarios, rather than simply choosing the user with the steepest gradient.

Primal ascent scheduling also yields an equivalent result to the so-called maximum C/I scheduling algorithm when the maximum C/I utility function U(r)=r is used.

However, primal ascent may be used where neither proportional fair nor maximum C/I scheduling is suitable. For example, consider the more general problem, $$\text{maximize } F(\vec{r}), \quad (4)$$

$$\text{subject to } \sum_{i=1}^{k} r_i < C, \quad (5)$$

$$\text{over } r_i \in S, \quad (6)$$

where C represents an aggregate throughput capability or overall throughput limit for the portion of the network 10 supporting the set of users, and S represents the set of possible or defined data rates supported by the network 10.

Figure 4:
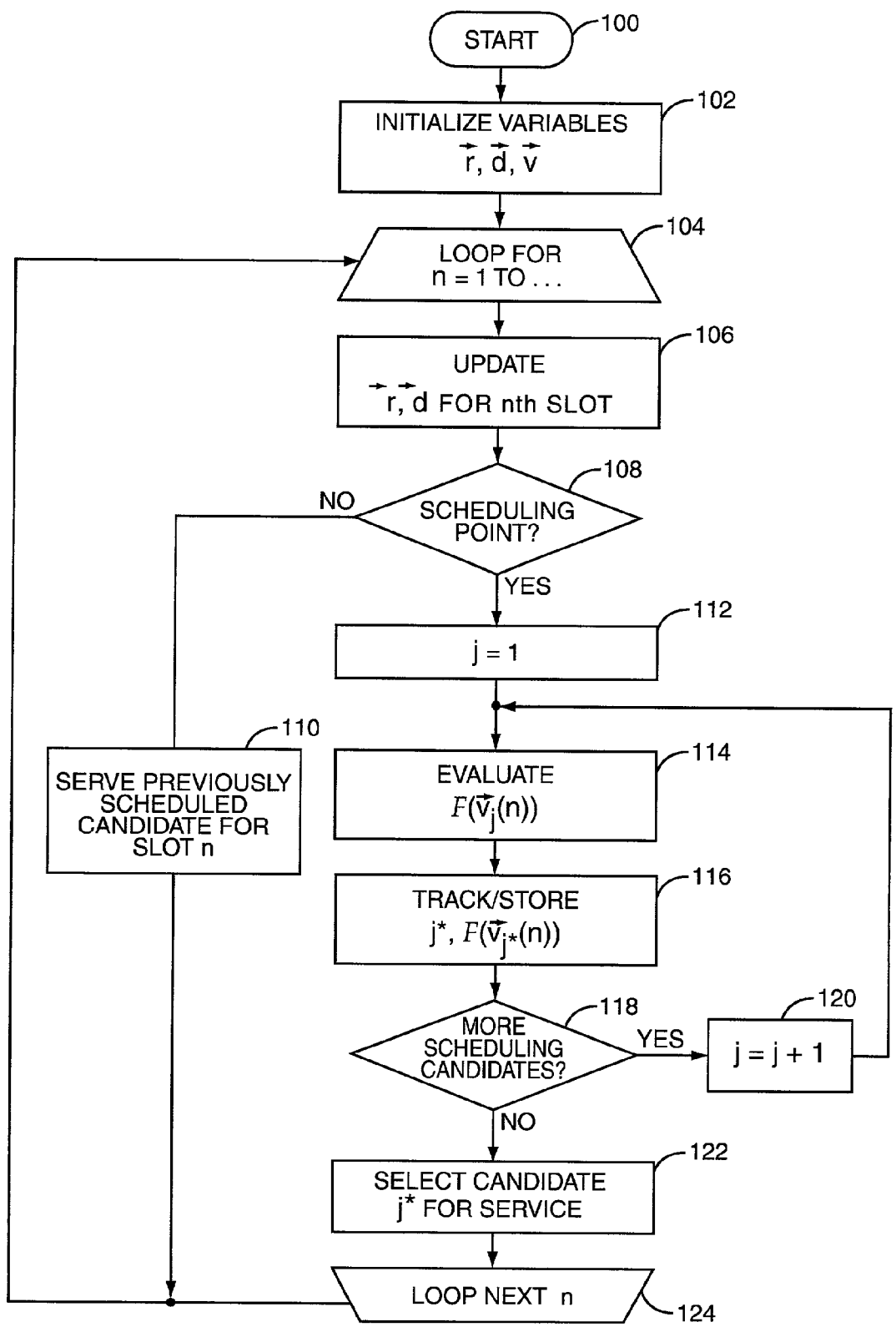
FIG. 4 is a diagram of exemplary logic for implementing the primal ascent scheduling technique of the present invention.

As before, unlike proportional fair or maximum C/I scheduling, the objective function F need not be differentiable or monotonic. FIG. 4 presents exemplary logic for the primal ascent approach to the scheduling problem framed by Eqs. 4–6.

Processing begins (step 100) with initialization of the relevant variables $\vec{r}, \vec{d}, \vec{v}$(step 102). Here, $\vec{r}$ represents the set of average throughputs for the users (i.e., ATs 18) being scheduled. Thus, $\vec{r}(n)$ represents the value of the average served rate vector set in the $n^{th}$ time slot. If there are N users being scheduled, $\vec{r}(n)$ comprises the individual average throughput value $r_j(n)$ for j=1 to N. Similarly, $\vec{d}(n)$ represents the set of requested data rates for serving individual ones of the users in the $n^{th}$ time slot, and is referred to as the user request rate vector. The vector $\vec{v}_j(n)$ represents the served rate vector at the start of time slot n+1 if the $j^{th}$ user is served in slot n. That is, the conditional served rate vector $\vec{v}_j(n)$ represents the set of vectors over which the objective function $F(\vec{v}_j(n))$ is to be maximized. In this example, the primal ascent approach evaluates net changes to determine which user j should be served to achieve the greatest gain in the objective function $F(\vec{v}_j(n))$.

After initialization, looping begins (step 104), with the algorithm repeatedly executing in an essentially infinite loop, repeating its objective function maximization over successive scheduling intervals by selecting the best user to serve at each scheduling decision point. In this context, a scheduling decision point is any point in time at which the primal ascent scheduler is required to make a scheduling decision. As will become clearer later, the scheduling intervals between scheduling decision points variably span a single and multiple HDR forward link time slots. Thus, in some circumstances, the scheduler makes scheduling decisions at each time slot, and in other circumstances, the scheduler makes scheduling decisions at multiples of individual time slots. With the dynamic nature of the radio environments associated with the users being scheduled and with changes in the constituency of the candidate set of users, the span of scheduling intervals is generally an ever-changing value.

In HDR networks, the number of time slots required to serve a given user depends on the requested data rate associated with that user. Thus, the decision to serve a given user commits the network 10 to serving that user for the required number of time slots. For example, at a given scheduling decision point, the primal ascent scheduler may select user x for service. Given user x's requested data rate, this decision requires the allocation of a given number of future time slots for serving this user. If past users previously selected for service have remaining allocated time slots, the scheduler may interleave user x's needed time slots with those previously allocated.

Further complicating this scenario, any one of the users which are currently allocated future time slots may report that some number of those future time slots is no longer needed as a result of successfully receiving data in a fewer number of time slots than was originally allocated. This circumstance might arise from radio conditions improving at the user's location.

Figure 5A:
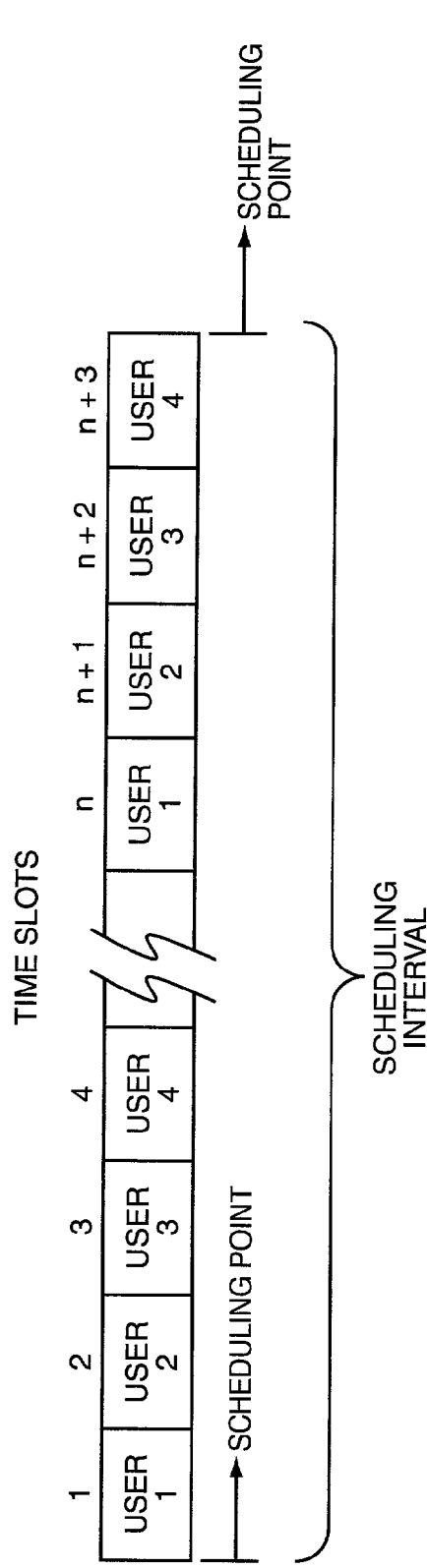
FIGS. 5A and 5B are diagrams of exemplary scheduling scenarios.
Figure 5B:
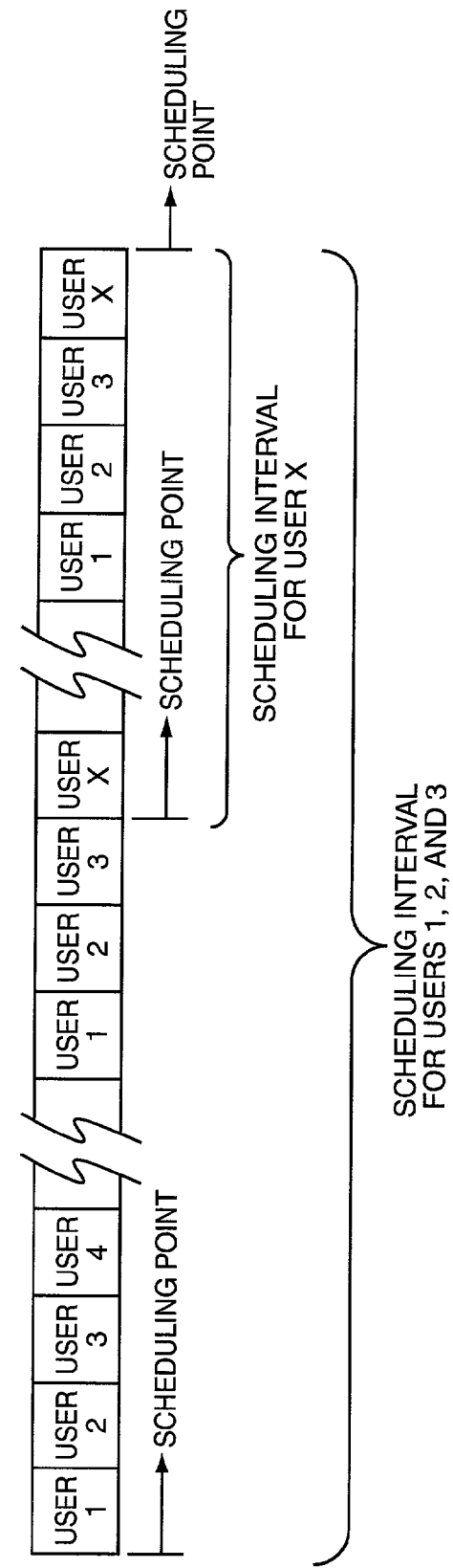

FIGS. 5A and 5B reflect some of these scheduling complexities. In FIG. 5A, the scheduler identifies the best (most favorable outcome in F) candidate for service (User 1), and the three next-best candidates for service (Users 2–4) at a given scheduling decision point. Here, all of the users selected for service require the same number y of time slots for delivering the associated data. This fact allows the scheduler to allocate 4y time slots in interleaved fashion. The next scheduling decision point is then fixed 4y time slots in the future, unless circumstances change, such as an early completion of data delivery to one or more of the users being served.

FIG. 5B illustrates a circumstance where time slots for a newly scheduled user x must be interleaved with time slots previously allocated to a set of earlier scheduled users. At an earlier scheduling decision point, the scheduler allocated a given number of future time slots to each of Users 1–4. In this example, User 4 needed fewer time slots than Users 1–3, and therefore the scheduler had an opportunity to interleave time slots for user x with the remaining time slots allocated to Users 1–3 at the point where scheduled service to User 4 ended. This example illustrates that the scheduler may have multiple, overlapping scheduling intervals involving different users or groups of users. Thus, depending on the staggering of these overlapping intervals, the scheduler may make scheduling decisions on a per-time slot basis, or less frequently, depending on exigencies of the moment.

With the above scheduling subtleties in mind, the discussion returns to the logic of FIG. 4. Within each time slot n, the average served rate vector and user request rate vector, $\vec{r}(n)$ and $\vec{d}(n)$ respectively, may be updated for the current time slot (step 106). Updating the average served rate vector $\vec{r}(n)$ comprises calculating the average throughputs associated with the users being scheduled in light of which user was served in the last slot, which calculation may be expressed in exemplary form as, $$r_i(n+1) = \begin{cases} \left(1 - \frac{1}{\tau_c}\right)r_i(n) + \frac{d_i(n)}{\tau_c} & \text{if user } i \text{ was served in the } n\text{th time slot,} \\ \left(1 - \frac{1}{\tau_c}\right)r_i(n) & \text{otherwise,} \end{cases} \quad (7)$$

where $\tau_c$ is a time constant associated with filtering the computed value of the average served rate vector $\vec{r}$. Updating the user request rate vector $\vec{d}$ comprises updating requested rate values based on DRC information received from or associated with each of the users in time slot n. Provisions may be made to accommodate instances where new DRC information is unavailable for one or more users, such as by using a past value or a default value.

Next, the scheduler determines if a scheduling decision is required at this point in time (step 108). If not, the scheduler continues in accordance with the previously determined scheduling decisions and serves the appropriate one of the previously scheduled users. However, if a scheduling decision is required, the scheduler initializes its candidate user index variable j (step 112) in preparation for determining the best user to serve.

In making this determination, the scheduler evaluates $F(\vec{v}_j(n))$ for each one of N service scenarios, where there are N user candidates (step 114). The scheduler tracks and stores, or otherwise maintains the results of that evaluation (step 116) so that the user j* corresponding to the greatest desired change in the objective function $F(\vec{v}_j(n))$ can be identified after evaluating all candidates. If there are more candidates to be evaluated (step 118), the user index variable is incremented (step 120), and the evaluation process repeats for the next user (steps 114–116).

One subtlety in the process should be noted here. If there are Ntotal users and y users still have future allocated time slots arising from prior service selections, the actual number of users that are evaluated as possible candidates for service is N–y. Thus, it should be understood that users already being served are not considered in making the current scheduling decision. The index variable j can be manipulated such that it skips those values associated with any user already being served.

After evaluating all users eligible for scheduling, the scheduler then selects the best user (i.e. user j*) corresponding to the maximum desired change in the objective function $F(\vec{v}_j(n))$ (step 122). Processing then continues (step 124) by looping to the next time slot.

As users are selected for service by the scheduler, it was earlier noted that the scheduler might apply overall constraints to its scheduling operations. For example, the scheduler might keep all users above a minimum data rate, assuming acceptable radio conditions for individual users. Further, the service provider might wish to avoid "overserving" individual users, and thus the benefit of serving a user at an already high average throughput might be made to fall off according to some desired barrier function.

Figure 6:
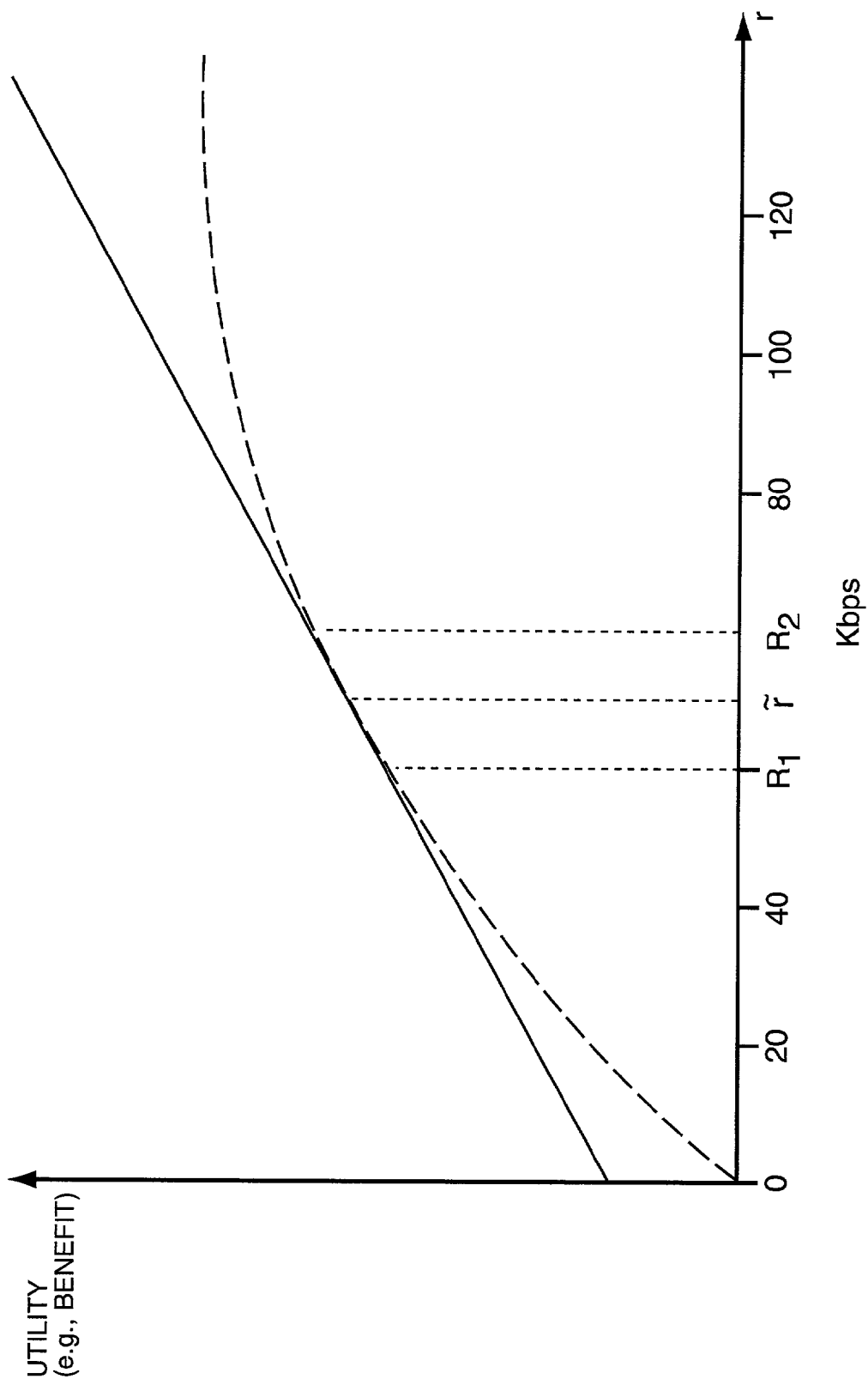
FIG. 6 is a graph of a utility function modified by use of one or more barrier functions.

FIG. 6 illustrates the use of upper and lower barrier functions as applied to an underlying utility function U(r). Here, it is desired to define an objective function $U_i(r_i)$ that maintains the rate of user i close to some target rate $\tilde{r}$, while still achieving some diversity gains by allowing fluctuations around this target value.

The following utility function may be used to accomplish this desired action and is expressed as, $$U_i(r_i) = r_i - \eta(r_i - \tilde{r}_i)^2, \quad (8)$$

where $\tilde{r}_i$ is the target rate for user i, and where $\eta$ may be configured as desired. When $\eta$ is large, and if $r_i << \tilde{r}_i$, then an increase in $r_i$ (i.e., serving user i) results in large increases of the objective function, thus encouraging service to that user. Conversely, if $r_i >> \tilde{r}_i$, then an increase in $r_i$ results in large decreases of the objective function, thus discouraging service to that user.

As evident from the graph, the original utility function U(r) (solid line) was defined as a straight linear function of average throughput r. However, with the application of lower and upper barrier functions, the utility function U(r) (dashed line) takes on pronounced curvatures at lower and upper throughput rate thresholds $R_1$ and $R_2$, respectively. These curvatures modify the net change in the objective function associated with serving users that fall into the regions of U(r) modified by the barrier functions. That is, choosing to serve users with average throughputs $r_i$ that fall below the lower threshold $R_1$ result in a relatively larger positive net change in the objective function.

Conversely, choosing to serve users with average throughputs $r_i$ that are above the upper threshold $R_2$ result in a relatively smaller positive net change in the objective function. This behavior has a tendency to favor users with low average throughput and disfavor serving users with high average throughput, resulting in the scheduler attempting to bias at least some users toward an acceptable middle range of data throughput.

Because primal ascent allows the scheduler to use different utility functions U(r) for different sets of users, some users may be scheduled according to different priorities. For example, the service provider may define different utility functions corresponding to differing qualities of service (QoS), and then assign these different utility functions to different classes or groups of users.

As a further illustration of the application of barrier functions to utility functions, a utility function may be defined as, $$U_i(r_i) = \begin{cases} r_i & \text{if } r_i > r_i^{min}, \\ \gamma r_i + r_i^{min}(1-\gamma) & \text{otherwise} \end{cases} \quad (9)$$

where $\gamma$ represents some biasing factor having a configured magnitude corresponding to the extent by which low-rate users are to be biased towards a higher data throughput. The service provider may thus set $\gamma$ to a fixed value, make it configurable on a per-user basis, configure it to change as a function of time or other parameter, or any combination of these techniques. Of course, the utility function $U_i(r_i)$ may also have barrier function modification for $r_{max}$ similar to that shown for $r_{min}$ in Eq. 9. Note that the utility function of Eq. 9 is not differentiable at $r_i=r_i^{min}$ and gradient-based scheduling approaches could not be easily used with this function.

In addition to the flexibility of handling non-differentiable utility functions, the primal ascent approach accommodates non-separable functions. Suppose that the service provider wishes to restrict the amount of bandwidth used by a particular class of users denoted by Q. One approach is to introduce a hard constraint where users in the class Q are not scheduled if their total average served rate exceeds a target value set by the service provider, or otherwise configured by the scheduler. However, suppose that only users of the class Q are using the network 10, such that the possibility that there will be service intervals during which no user is served.

The primal ascent approach can handle this scenario by falling back to a more relaxed constraint governing the service of users. However, because primal ascent techniques relieve many constraints on allowable utility and objective functions, one might incorporate a barrier function into the objective function F as, $$F_b[\vec{r}(n)] = \begin{cases} 0 & \text{if } \sum_{i \in Q} r_i < r^{max} \\ -\left(\sum_{i \in Q} r_i - r^{max}\right)^2 & \text{otherwise} \end{cases} \quad (10)$$

The expression for the objective function given in Eq. 10 above has no effect on the objective function when the soft constraint is satisfied, but causes the objective function to decrease in value when the soft constraint is violated. If only users of the restricted class Q are using the network 10, then the barrier function has negligible effect on the scheduling decisions made. Note that the above objective function (including the barrier function) is non-separable and therefore potentially difficult to use with gradient-based schedulers.

A further point of flexibility involves time-dependent user scheduling. That is, the service provider may want to use different scheduling priorities at different times during the day. Suppose that a combination of M different functions (possibly including barrier, reward, utility, and revenue functions) are required or desired. This set of functions may be denoted by $F(\vec{r})$.

Let T denote the time of day, and let $$\left\{ \vec{\alpha}(T) \in R^m \mid \alpha_i > 0 \forall i \text{ and } \sum_{i=1}^{m} \alpha_i(T) = 1 \right\}$$

denote the weighting to be assigned to each function for each time of day T (e.g., for each hour). One may then use the following time-dependent objective function F to in user scheduling, $$F(\vec{r}) = \Sigma \alpha_i(T) F_i(\vec{r}) \quad (11)$$

where $\alpha_i$ represents the weighting factor for $F_i$, and $\vec{r}$ represents the average served rate vector as discussed in conjunction with the logic flow diagram of FIG. 4.

The service provider or network operator might set different weighting factors $\alpha_i$ for different times of the day to effect changing scheduling priorities, and might further apply different sets of weighting factors to different classes of users.

In general, the primal ascent scheduling techniques of the present invention are advantageously used to schedule users sharing the air interface in a HDR network. By calculating the net change(s) in the desired objective function(s) that would arise from serving each user, the primal ascent approach identifies the user to whom service would yield the greatest or most desirable benefit. Because primal ascent evaluates the net change (i.e., it considers the affect of actually providing the user, if selected, the requested amount of data), primal ascent allows great flexibility in the types of underlying cost or benefit functions that may be optimized.

Of course, the above time-of-day details, like the earlier general developments of the primal ascent approach, are subject to significant variation. As such, the present invention is not limited by the foregoing details rather the present invention is limited only by the scope of the following claims, and the reasonable equivalents thereof.

What is claimed is:

1. A method of scheduling use of a resource shared by a plurality of user candidates, the method comprising:
    assigning a utility function to each of the candidates;
    for each candidate, jointly evaluating the utility functions to determine an outcome that would arise from serving the candidate under consideration to the exclusion of the other candidates; and
    serving the candidate having the most favorable outcome.

2. The method of claim 1 wherein assigning a utility function to each of the plurality of candidates comprises assigning the same utility function to all the candidates.

3. The method of claim 1 wherein the plurality of candidates comprise at least two users classes, and wherein assigning a utility function to each of the plurality of candidates comprises assigning one of at least two utility functions to candidates based on said user class.

4. The method of claim 1 wherein assigning a utility function to each of the plurality of candidates comprises assigning one of two or more utility functions to each candidate based on a desired quality of service associated with the candidate.

5. The method of claim 1 wherein assigning a utility function to each of the plurality of candidates comprises assigning one of at least two utility functions to each candidate based on a time of day.

6. The method of claim 5 further comprising assigning a particular one of said at least two utility functions to the candidate based on a user class of the candidate.

7. The method of claim 1 wherein said resource comprises an air interface supporting RF communication between the candidates and a HDR communication network, and wherein said scheduling of candidates comprises scheduling use of said air interface.

8. The method of claim 7 further comprising defining one or more of said utility functions such that scheduling of the candidates is biased towards achieving a target average data throughput for one or more of the candidates.

9. The method of claim 8 further comprising applying a barrier function to said one or more utility functions to effect said biasing.

10. The method of claim 7 wherein each of the candidates has a corresponding average data throughput based on past service to the candidate, and further comprising capping the utility functions assigned to one or more of the candidates to limit the average data throughput achievable by said one or more of the candidates.

11. The method of claim 7 wherein each of the candidates has a corresponding average data throughput based on past service to the candidate, and further comprising limiting a minimum value of the utility functions assigned to one or more of the candidates to attempt to maintain the average data throughput of said one or more of the candidates above a desired minimum value.

12. The method of claim 7 further comprising defining said utility functions to be functions of an average data throughput associated with each of the candidates, said average data throughput dependent upon past scheduling of the candidate.

13. The method of claim 12 further comprising receiving service request information from the candidates defining an amount of data desired by each candidate during a subsequent service interval.

14. The method of claim 13 wherein jointly evaluating said utility functions to determine an outcome comprises determining a net change in benefit that would arise from serving the candidate under consideration in accordance with said service request information to the exclusion of the other candidates during at least a portion of said subsequent service interval.

15. The method of claim 1 wherein for each candidate, jointly evaluating said utility functions comprises determining an aggregate change in benefit that would arise from serving the candidate under consideration and not serving the remaining candidates.

16. The method of claim 15 wherein determining an aggregate change in benefit comprises evaluating the overall change in benefit as given by the utility functions assigned to the candidates that would result from selecting the candidate under consideration for service.

17. The method of claim 1 further comprising performing said steps of evaluating and serving at repeated serving intervals, such that the candidates are generally served by a schedule that tends to maximize an overall benefit.

18. A method of scheduling use of an air interface in a HDR communication network between a plurality of user candidates in each of a succession of service intervals, the method comprising:
   tracking average served rates for the candidates, where said average served rates are dependent upon scheduling decisions made in past service intervals;
   for each candidate, evaluating an objective function having an initial value dependent upon said average served rates and a next value dependent upon an aggregate change that would arise from serving the candidate under consideration to the exclusion of the other candidates; and
   serving the candidate that yields the most favorable aggregate change in said objective function.

19. The method of claim 18 further comprising assigning a utility function to each said candidate, said utility functions characterizing the benefit of serving said candidates as functions of said average served rates.

20. The method of claim 19 further comprising defining said objective function to be a function of said utility functions such that said aggregate changes in said objective function reflect aggregate changes in benefit.

21. The method of claim 19 further comprising assigning a first utility function to a first set of candidates and assigning a second utility function to a second set of candidates, such that said first and second sets of candidates have different scheduling priorities, and wherein said first and second sets of candidates together comprise said plurality of candidates.

22. The method of claim 19 further comprising defining one or more ones of said utility functions as time-dependent utility functions, such that candidates assigned a time-dependent utility function have a time-dependent scheduling priority.

23. The method of claim 19 further comprising assigning multiple utility functions to one or more of said candidates, such that a scheduling priority of the candidate depends upon said multiple functions.

24. The method of claim 19 further comprising limiting a lower value of one or more of said utility functions so that one or more of said candidates are scheduled for service in a manner that attempts to maintain said average served data rates for said one or more candidates above a minimum data rate.

25. The method of claim 19 further comprising limiting an upper value of one or more of said utility functions so that one or more of said candidates are scheduled in a manner such that said average served data rates for said one or more candidates remains below a maximum data rate.

26. The method of claim 18 further comprising incorporating a barrier function into said objective function such that said candidates are scheduled according to a constraint imposed by said barrier function.

27. The method of claim 18 further comprising, for each candidate, determining said next value of said objective function based on a desired data rate for serving said candidate under consideration.

28. The method of claim 27 further comprising receiving said desired data rate from said candidate.

29. The method of claim 28 further comprising receiving desired data rate from said candidate as a DRC value transmitted from said candidate to said HDR communication network.

30. A method of scheduling use of a resource shared by a plurality of user candidates, the method comprising:
defining a set of two or more utility functions;
assigning each candidate to a user class;
assigning a utility function to each candidate based on the user class of said candidate;
for each candidate, jointly evaluating said utility functions for all candidates to determine a selection metric associated with potentially serving the candidate under consideration; and
allocating the shared resource for a designated time to the candidate having the most favorable selection metric.

31. The method of claim 30 wherein allocating said shared resource for a designated time to the candidate having the most favorable selection metric comprises allocating said resource to the candidate that maximizes the selection metric.

32. The method of claim 30 further comprising associating differing qualities of service with said user classes, such that candidates from a user class having a relatively higher associated quality of service are favored in said allocation of said resource.

33. The method of claim 32 wherein said resource comprises an air interface in a HDR communication network, and wherein candidates in said user class having a relatively higher associated quality of service are scheduled for use of said air interface to achieve relatively higher average data throughputs to those candidates.

34. The method of claim 30 further comprising defining said utility functions to characterize the benefit of serving said candidates.

35. The method of claim 34 further comprising defining said utility functions to be functions of average served data rates associated with past service to said candidates, such that a benefit value associated with serving a given one of said candidates depends upon the average served data rate associated with said candidate and the particular utility function assigned to said candidate.

36. The method of claim 35 further comprising determining a change in benefit for each said candidate by determining an incremental change in average served data rate that would arise from serving said candidate in the designated time.

37. The method of claim 36 wherein jointly evaluating said utility functions for all candidates to determine said selection metric comprises determining a net change in overall benefit that would arise from serving each candidate under consideration to the exclusion of the other candidates for a defined time.

38. A method of scheduling use of a resource shared by a plurality of user candidates, the method comprising:
defining a set of two or more utility functions;
assigning a utility function to each of the candidates, wherein the utility function assigned to at least one of the candidates is a function of time;
for each candidate, jointly evaluating the utility functions for all candidates to determine a selection metric associated with potentially serving the candidate under consideration; and
allocating the shared resource for a designated time to the candidate having the most favorable selection metric.

39. The method of claim 38 further wherein the utility function assigned to said at least one of said candidates is made time dependent by including a time-dependent weighting factor in said utility function.

40. The method of claim 39 further comprising adjusting a scheduling priority based on a time of day for said at least one candidate assigned said time-dependent utility function.

41. The method of claim 38 further comprising:
assigning individual ones of said candidates to one of at least two user classes;
assigning time-dependent utility functions to candidates in at least one of said user classes, such that candidates in said at least one user class have scheduling priorities dependent upon the time of day.

42. The method of claim 38 adjusting the utility function that is a function of time such that a scheduling priority of candidates assigned said utility function changes as a function of time.

43. A communication network entity for use in a HDR network and adapted to schedule use of an air interface shared by a plurality of user candidates, said network entity comprising a processor adapted to:
assign a utility function to each of the candidates;
jointly evaluate the utility functions to determine an outcome that would arise from serving each candidate to the exclusion of the other the candidates for a defined time; and
select the candidate having the most favorable outcome for service.

44. The network entity of claim 43 wherein said processor assigns the same utility function to all said candidates.

45. The network entity of claim 43 wherein said processor assigns a first utility function to at least one of said candidates, and assigns a different, second utility function to another one of said candidates.

46. The network entity of claim 45 wherein said processor assigns said first utility function to candidates in a first user class and assigns said second utility function to candidates in a second user class, said first and second utility functions defined to permit candidates in said first and second user classes to be scheduled with different priorities.

47. The network entity of claim 46 where said processor schedules candidates in said first and second of user classes to provide different qualities of service to candidates in different user classes.

48. The network entity of claim 43 wherein said processor assigns one of two or more utility functions to each candidate based on a desired quality of service associated with said candidate.

49. The network entity of claim 43 wherein said processor assigns a time-dependent utility function to at least one of said candidates, such that said candidate has a time-dependent scheduling priority.

50. The network entity of claim 49 wherein said processor determines whether or not to assign a time-dependent utility function to a given candidate based on a user class associated with said given candidate.

51. The network entity of claim 43 wherein said processor biases scheduling of said candidates to move an average served data rate of one or more ones of said candidates towards a target average served data rate.

52. The network entity of claim 51 wherein said processor effects said biasing by defining one or more of said utility functions according to a desired biasing scheme.

53. The network entity of claim 51 wherein said processor applies a barrier function to one or more of said utility functions to effect said biased scheduling.

54. The network entity of claim 43 wherein said processor biases scheduling said candidates to maintain an average served data rate of one or more of said candidates above a desired minimum threshold.

55. The network entity of claim 54 wherein said processor applies a barrier function to one or more ones of said utility functions to effect said biased scheduling.

56. The network entity of claim 43 wherein said processor:
- tracks an average served data rate for each of said candidates; and
- defines said utility functions to be functions of said average served data rates, such that a change in benefit arising from serving a given one of said candidates is a function of an incremental change in said average served data rate that would result from serving said given one of said candidates.

57. The network entity of claim 56 wherein said processor:
- associates a desired data rate with each of said candidates; and
- determines said incremental change in said average served rate based on serving said given one of said candidates at said associated desired data rate.

58. The network entity of claim 56 wherein said processor limits the utility functions assigned to one or more of said candidates to limit the average served data rate achievable by said one or more candidates.

59. The network entity of claim 56 wherein said processor bounds the utility functions assigned to one or more of said candidates to maintain a minimum average served data rate for said one or more candidates.

60. The network entity of claim 43 wherein said network entity comprises a radio base station that provides radio resources for communicating with said plurality of users via said air interface.

61. The network entity of claim 43 wherein said network entity comprises a base station controller, said base station controller operative to control one or more radio base stations that provide said air interface to said plurality of users.

62. A method of scheduling use of a resource shared by a plurality of access terminals, the method comprising:
- assigning a utility function to each of the access terminals;
- for each access terminal, evaluating the utility functions of said plurality of access terminals to determine an outcome that indicates potential changes associated with said utility functions when said each access terminal is served and the remaining access terminals are excluded from service; and
- serving the access terminal having the outcome associated therewith that indicates the most favorable potential changes.

63. The method of claims 62, wherein evaluating the utility functions of said plurality of access terminals to determine an outcome includes jointly evaluating the utility functions of said plurality of access terminals to determine the outcome.

64. The method of claims 62, wherein each of the potential changes is a negative, positive, or neutral beneficial change associated with the respective utility function.

65. The method of claims 64, wherein serving the access terminal includes serving the access terminal having the outcome associated therewith that indicates the highest number of positive beneficial changes.

\* \* \* \* \*

UNITED STATES PATENT AND TRADEMARK OFFICE
CERTIFICATE OF CORRECTION

PATENT NO. : 6,985,462 B2 Page 1 of 1
APPLICATION NO. : 09/972793
DATED : January 10, 2006
INVENTOR(S) : Hosein It is certified that error appears in the above-identified patent and that said Letters Patent is hereby corrected as shown below:

In Column 6, Line 32, delete "$P_{d(n)}$" and insert -- $P_{(n)}$ --, therefor.

In Column 16, Line 22, in Claim 43, after "of the other" delete "the".

In Column 18, Line 18, in Claim 63, delete "claims" and insert -- claim --, therefor.

In Column 18, Line 24, in Claim 64, delete "claims" and insert -- claim --, therefor.

In Column 18, Line 27, in Claim 65, delete "claims" and insert -- claim --, therefor.

Signed and Sealed this

First Day of April, 2008

JON W. DUDAS
*Director of the United States Patent and Trademark Office*